(12) United States Patent
Foley et al.

(10) Patent No.: US 7,475,046 B1
(45) Date of Patent: Jan. 6, 2009

(54) ELECTRONIC TRADING SYSTEM SUPPORTING ANONYMOUS NEGOTIATION AND INDICATIONS OF INTEREST

(75) Inventors: Kevin Foley, New York, NY (US); Kim Bang, Englewood, NJ (US)

(73) Assignee: Bloomberg L.P., New York, NY (US)

( * ) Notice: Subject to any disclaimer, the term of this patent is extended or adjusted under 35 U.S.C. 154(b) by 1165 days.

(21) Appl. No.: 09/412,408

(22) Filed: Oct. 5, 1999

(51) Int. Cl.
*H04K 1/00* (2006.01)
*H04L 9/00* (2006.01)
*G06Q 40/00* (2006.01)

(52) U.S. Cl. .......................................... 705/74; 705/37
(58) Field of Classification Search ..................... 705/1, 705/35, 36, 37, 74
See application file for complete search history.

(56) References Cited

U.S. PATENT DOCUMENTS

| | | | |
|---|---|---|---|
| 3,573,747 A | | 4/1971 | Adams et al. |
| 3,581,072 A | | 5/1971 | Nymeyer |
| 4,412,287 A | | 10/1983 | Braddock, III |
| 4,674,044 A | | 6/1987 | Kalmus et al. |
| 4,903,201 A | | 2/1990 | Wagner |
| 5,038,284 A | | 8/1991 | Kramer |
| 5,077,665 A | * | 12/1991 | Silverman et al. ........... 364/408 |
| 5,101,353 A | * | 3/1992 | Lupien et al. ................. 705/37 |
| 5,136,501 A | | 8/1992 | Silverman et al. |
| 5,243,331 A | * | 9/1993 | McCausland et al. ....... 345/172 |

(Continued)

FOREIGN PATENT DOCUMENTS

EP 0512702 11/1992

(Continued)

OTHER PUBLICATIONS

John Downes, Jordan Elliot Goodman; "Dictionary of Finance and Investment Terms", p. 281, Barron's Financial Guides, Copyright 1998.*

(Continued)

*Primary Examiner*—Calvin Hewitt
*Assistant Examiner*—Charles C Agwumezie
(74) *Attorney, Agent, or Firm*—Frank J DeRosa; Frommer Lawrence & Haug LLP

(57) ABSTRACT

A system conducts anonymous negotiations and supports indications of interest in trading stock. The system includes a database for storing public orders received from a public stock trading system; and a server for receiving hidden orders from a plurality of users and for conducting anonymous negotiations between first and second users with the hidden orders. The server repeatedly accesses the database to determine a match of any one of the hidden orders with any one of the public orders, and to execute a pair of orders selected from the hidden orders and the public orders. The system also transmits indications of interest (IOIs) into a trading environment using the server for processing a trading order from a first user and for maintaining a profile of a user. The profile includes a current IOI setting for controlling transmission of the IOI from the user. The server responds to a toggle command from the first user to control transmission of the IOI opposite to the current IOI setting. The server responds to the IOI setting being set to allow transmission by transmitting the IOI of the first user associated with the trading order.

15 Claims, 19 Drawing Sheets

U.S. PATENT DOCUMENTS

| | | | | |
|---|---|---|---|---|
| 5,262,942 | A | * | 11/1993 | Earle .......................... 705/37 |
| 5,297,031 | A | | 3/1994 | Gutterman et al. |
| 5,727,165 | A | | 3/1998 | Ordish et al. |
| 5,835,896 | A | | 11/1998 | Fisher et al. .................. 705/37 |
| 5,845,266 | A | | 12/1998 | Lupien et al. ................. 705/37 |
| 5,873,071 | A | * | 2/1999 | Ferstenberg et al. .......... 705/37 |
| 5,905,974 | A | | 5/1999 | Fraser et al. |
| 5,924,082 | A | * | 7/1999 | Silverman et al. ............. 705/37 |
| 6,003,019 | A | * | 12/1999 | Eaton et al. ................... 705/42 |
| 6,014,643 | A | * | 1/2000 | Minton ......................... 705/37 |
| 6,112,181 | A | | 8/2000 | Shear et al. .................... 705/1 |
| 6,161,099 | A | * | 12/2000 | Harrington et al. ............ 705/37 |
| 6,278,982 | B1 | * | 8/2001 | Korhammer et al. ...... 705/36 R |
| 6,377,940 | B2 | * | 4/2002 | Tilfors et al. .................. 705/37 |

FOREIGN PATENT DOCUMENTS

| | | |
|---|---|---|
| GB | 1489573 | 10/1977 |
| WO | WO 98/13778 | 4/1998 |

OTHER PUBLICATIONS wysiwyg://71/http://www.investorwords.com/cgi-bin/getword.cgi?177.*

"The AutEx Group Delivers Internet-Accessed Equity Trading Data," Feb. 17, 1998 http://www.autexgroup.com/press0298.htm.

"AUTEX+Service Overview," http//www.autexsys.com/about.htm.

"Virtual Trading," Richard Burdge, Jan./Feb. 1999, http://reuters.co/magazine/janfeb99/fea.htm.

"What You Need To Know About ATSs," J. Christopher Giancarlo, Dec. 1998, eSecurities, vol. 1, No. 4.

"Bloomberg builds a bigger black box," R. Scott Raynovich, May 21, 1999, http://www.redherring.com/insider/1999/0521/inv-bloomberg.html.

"Global Investment Technology," Aug. 30, 1999, http://www.instinet.co/news/art_git_8-30-99.html.

"Smal ECN's Next Giant Target," Shailaja Sneelakantan, Jun. 24, 1999, Trading & Technology.

"Bloomberg and CLSA join forces to form Global Tradebook," May 19, 1999, http:/www.bloomberg.com/products/trdbk.html (Tradebook Press Releases).

"Bloomberg and ITG to form 'SuperECN'," May 20, 1999, http://www.bloomberg.com/products/trdbk.html (Tradebook Press Releases).

National Association of Securities Dealers, Inc. (NASD) Conduct Rule 2320, "Best Execution and Interpositioning," dated May 1, 1968. Printed form NASDR.com Jun. 26, 2002.

Sam Johnson/goldman, sachs & co., FIXProtocol, "FIX 4.1Specification Draft Is available" Jan. 12, 1998 http://www.fixprotocol.org/discuss/read/33ed5258>.

Peter Chapman, TRADERS magazine.com, "Order out of Chaos on Buy-Side Desks: Proliferating Order Management Systems" Sep. 1999 http://tradersmagazine.com/issues/19990930/2.

"J.P. Morgan. PricewaterhouseCoopers propose FpML, a new e-commerce standard" Jun. 9, 1999 http://xml.coverpages.org/fpml-press9906.html.

Emmerich W. et al., :Markup meets middleware, Distributing Computing Systems, Proceedings. 7th IEEE Workshop on Future Trends of Capetown, S. Africa Dec. 20-22, 1999.

* cited by examiner

<BUY> INTC 10000 62 <GO>

INTC US 1 62¼ +⅜ 0 9s 0 15⅝/62⅛ 0 8x13 Equity BTMQ
HI 15:26 Vol 10,026,900 Op 61⅞ 0 Hi 63 0 Lo 60⅝ 0 Val Trd 622.23m  15:26

TRADEBOOK QUOTE MONITOR

INTC  INTEL CORP   VWAP: 62.057

| Cumulative | Mmkr | Size | BID | | ASK | Size | Mmkr | Cumulative |
|---|---|---|---|---|---|---|---|---|
| 8 | SBSH | 8 | 62⅝ | | 62⅛ | 13 | INCA | 13 |
| 16 | >BTRD | 8 | 62⅛ | | 62⅛ | 1 | BEST | 14 |
| 26 | SHWD | 10 | 62⅛ | | 62¾ | 2 | REDI | 16 |
| 96 | >BTRD | 70 | 62⅛ | | 62⅛ | 10 | SHWD | 26 |
| 116 | INCA | 20 | 62⅛ | | 62⅛ | 10 | MINT | 36 |
| 126 | MLCO | 10 | 62⅛ | | 62⅛ | 4 | NFSC | 40 |
| 136 | MINT | 10 | 62⅛ | | 62⅛ | 2 | MASH | 42 |
| 146 | GSCO | 10 | 62⅛ | | 62⅛ | 1 | SLKC | 43 |
| 156 | CIBC | 10 | 62⅛ | | 62⅝ | 45 | ISLD | 88 |
| 166 | MSCO | 10 | 62⅛ | | 63 | 83 | MUSE | 171 |
| 171 | ISLD | 5 | 62⅛ | | 63 | 41 | MLCO | 212 |
| 172 | SLKC | 1 | 62⅛ | | 63 | 24 | BRUT | 236 |

OR INTC 1s62⅝  3s62⅝  9s62⅝   1s62¼  2s62⅝  10s62⅝
BTTR  15:10-5s62⅛  US                15:11-10s62⅝  15:23-7s62⅛
IIRA TRD 195,000 INTC  US           6223 BTRD US 15:19 BTRD  USD
ICH BN 15:02 U.S. April Consumer Prices Seen Rising 0.4%: Bloomberg Survey
                                My Orders

```
                                                    DG21 b Equity B T N A
 INTC  US $   Market Q↑7 5 ⁵/₈ /7 5 ³/₁₆   3x10   Vol 28,200    Prev 75³ ₁₆
<TAB> to select counterparties. 99 <GO> to view buy activity.
┌─────────────────────────────────────────────────────────────────────────┐
│                    N E G O T I A T E   T O   B U Y                      │
│                          INTC  -  INTEL CORP                            │
│                                                                         │
│    Total shares I bought today            0                             │
│    Quantity displayed to others           0                             │
└─────────────────────────────────────────────────────────────────────────┘
                Trading activity      All counterparties
┌───────────────────────Counterparty sell activities──────────────────────┐
│ ▯ 9/29      600@ 75.7969   ▯ 9/10   1000@ 88.0625   ▯ 8/12    2000@ 75.9375 │
│ ▯ 9/29     2800@ 77.0000   ▯ 9/10   1000@ 88.0625   ▯ 8/ 9   18000@ 73.3750 │
│ ▯ 9/28      700@ 78.0000   ▯ 9/ 8   5000@ 89.0000   ▯ 8/ 6   50000@ 72.0000 │
│ ▯ 9/21      100@ 82.1094   ▯ 9/ 1  64900@ 84.9688   ▯ 8/ 4  199000@ 78.0000 │
│ ▯ 9/17     1000@ 84.6250   ▯ 9/ 1  10000@ 84.6406   ▯ 8/ 3   16000@ 77.0000 │
│ ▯ 9/17    10500@ 85.1875   ▯ 8/30   1000@ 83.0000   ▯ 7/29    2500@ 70.3906 │
│ ▯ 9/17    95000@ 84.7656   ▯ 8/25   1000@ 50.3906   ▯ 7/27    1000@ 25.0000 │
│ ▯ 9/17      100@ 84.5000   ▯ 8/24   8000@ 83.7031   ▯ 7/26    1000@ 72.0000 │
│ ▯ 9/17     6700@ 85.1094   ▯ 8/20  11300@ 80.1562   ▯ 7/26   10000@ 65.0000 │
│ ▯ 9/17    19400@ 84.3750   ▯ 8/19   3500@ 77.3750   ▯ 7/ 8 2189500@ 64.2656 │
│ ▯ 9/17  1000000@ 90.0000   ▯ 8/18    300@ 80.0000   ▯ 7/ 8   10000@ 64.3125 │
│ ▯ 9/16     1000@ 82.8125   ▯ 8/17   1400@ 77.8125   ▯ 7/ 7    5000@ 64.4375 │
│ ▯ 9/14     1000@ 85.1250   ▯ 8/16  13000@ 78.9688   ▯ 6/29   19500@ 58.3594 │
│             *Live order       *Trade        *Expired order              │
└─────────────────────────────────────────────────────────────────────────┘
```

```
                                                    DG21 b Equity B T N A
[I N T C] US $    Market Q↑7 5 ⁵⁄₈/7 5 ³⁄₁₆Q   3x10  Vol 28,200   Prev 75³⁄₁₆
1 <GO> for ticket.
                    N E G O T I A T E   T O   B U Y
                         INTC - INTEL CORP Total shares I bought today          0
    Quantity displayed to others         0

Trading activity   All counterparties
                       Counterparty sell activities
 □ 9/29      600@ 75.7969   □ 9/10     1000@ 88.0625   □ 8/12    2000@ 75.9375
 □ 9/29     2800@ 77.0000   □ 9/10     1000@ 88.0625   □ 8/ 9   18000@ 73.3750
 ⊠ 9/28      700@ 78.0000   ⊠ 9/ 8     5000@ 89.0000   ⊠ 8/ 6   50000@ 72.0000
 ⊠ 9/21      100@ 82.1094   □ 9/ 1    64900@ 84.9688   ⊠ 8/ 4  199000@ 78.0000
 ⊠ 9/17     1000@ 84.6250   □ 9/ 1    10000@ 84.6406   □ 8/ 3   16000@ 77.0000
 □ 9/17    10500@ 85.1875   □ 8/30     1000@ 83.0000   □ 7/29    2500@ 70.3906
 □ 9/17    95000@ 84.7656   □ 8/25     1000@ 50.3906   □ 7/27    1000@ 25.0000
 □ 9/17      100@ 84.5000   □ 8/24     8000@ 83.7031   □ 7/26    1000@ 72.0000
 □ 9/17     6700@ 85.1094   □ 8/20    11300@ 80.1562   □ 7/26   10000@ 65.0000
 □ 9/17    19400@ 84.3750   □ 8/19     3500@ 77.3750   □ 7/ 8 2189500@ 64.2656
 □ 9/17  1000000@ 90.0000   □ 8/18      300@ 80.0000   □ 7/ 8   10000@ 64.3125
 □ 9/16     1000@ 82.8125   □ 8/17     1400@ 77.8125   □ 7/ 7    5000@ 64.4375
 □ 9/14     1000@ 85.1250   □ 8/16    13000@ 78.9688   □ 6/29   19500@ 58.3594
              *Live order      *Trade         *Expired order
```

DG21 b Equity BTNA

1 <GO> for ticket.

```
                    NEGOTIATE TO BUY
                   ┌─────────────────────────────────────┐
       Total s     │  NEGOTIATE TO BUY    INTC           │        128
       Quantit     │                                     │       ↙
                   │         Contact  7 parties          │
                   │  Bid shares              Per party  │
    □ 9/29         │  Price                              │    0@ 75.9375
    □ 9/29    2    │  Negotiation exposure               │    0@ 73.3750
    ☒ 9/28         │  Total exposure:        0 shares    │    0@ 72.0000
    ☒ 9/21         │                                     │    0@ 78.0000
    ☒ 9/17    1    │                                     │    0@ 77.0000
    □ 9/17   10    │        <MENU> to return             │    0@ 70.3906
    □ 9/17   95    │                                     │    0@ 25.0000
    □ 9/17         └─────────────────────────────────────┘    0@ 72.0000
    □ 9/17      6700@ 85.1094    □ 8/20  11300@ 80.1562    □ 7/26    10000@ 65.0000
    □ 9/17     19400@ 84.3750    □ 8/19   3500@ 77.3750    □ 7/ 8  2189500@ 64.2656
    □ 9/17   1000000@ 90.0000    □ 8/18    300@ 80.0000    □ 7/ 8    10000@ 64.3125
    □ 9/16      1000@ 82.8125    □ 8/17   1400@ 77.8125    □ 7/ 7     5000@ 64.4375
    □ 9/14      1000@ 85.1250    □ 8/16  13000@ 78.9688    □ 6/29    19500@ 58.3594
                    *Live order    *Trade      *Expired order
```

FIG. 10

```
                                                    DG21 b Equity B T N T
[I N T C] US $   Market Q↑7 5 ⁵/₈ /7 5 ³/₁₆ Q  3x10  Vol 28,200  Prev 75³/₁₆
              Cancel all open negotiations for INTC          Page  1/1
     T R A D E B O O K   N E G O T I A T I O N S   M O N I T O R
  ACTION       SIDE    SHARES   PRICE   RESERVE                    TIME
 1) SENT       BID     3000     25      7000    to  7 parties      8:49

Open negotiations:
```

FIG. 11

DG21 b Equity B T N T

| | Cancel all open negotiations for INTC | | | | | | Page 1/1 |
|---|---|---|---|---|---|---|---|
| T R A D E B O O K | N E G O T I A T I O N S | | | M O N I T O R | | | |
| ACTION | SIDE | SHARES | PRICE | RESERVE | | | TIME |
| 1) RCVD | OFFER | 3000 | 77 | | | | 8:50 |
| 2) RCVD | OFFER | 3000 | 75 | | | | 8:49 |
| 3) SENT | BID | 3000 | 25 | 7000 | to | 7 parties | 8:49 |

Open negotiations:

FIG. 12

```
                                                            DG21 b Equity B T N T
              Cancel all open negotiations for INTC      Page  1/1
      T R A D E B O O K   N E G O T I A T I O N S   M O N I T O R
      ACTION      SIDE     SHARES    PRICE   RESERVE                TIME
  1) RCVD         OFFER    3000      77                             8:50
  2) RCVD         OFFER    3000      75                             8:49
  3) SENT                                                           8:49
                          B U Y    I N T C
                Total exposure:     10000 shares Shares:     3000
                         Price:    77

1<GO> to accept   2<GO> to decline   <MENU> to return       ⎱
                                                                         ⎰ —130

Open negotiations:
```

FIG. 13

```
                                                              DG21 b Equity B T N T
┌─────────────────────────────────────────────────────────────────────────────────┐
│              Cancel all open negotiations for INTC           Page   1/1         │
│     T R A D E B O O K   N E G O T I A T I O N S     M O N I T O R              │
│    ACTION          SIDE     SHARES   PRICE   RESERVE                      TIME  │
│ 1) SENT            BID      3000     77                                   8:52  │
│ 2) RCVD EXPIRED    OFFER    3000     77                                   8:52  │
│ 3) RCVD EXPIRED    OFFER    3000     75                                   8:51  │
│ 4) EXPIRED         BID      10000    25                                   8:51  │
│ 5) RCVD            OFFER    3000     77                                   8:50  │
│ 6) RCVD            OFFER    3000     75                                   8:49  │
│ 7) SENT            BID      3000     25      7000    to   7 parties       8:49  │
│                                                                                 │
│                                                                                 │
│                                                                                 │
│                                                                                 │
│                                                                                 │
├─────────────────────────────────────────────────────────────────────────────────┤
│ Open negotiations:                                                              │
│                                                                                 │
└─────────────────────────────────────────────────────────────────────────────────┘
```

FIG. 14

Page  DG21 b Equity BTPR
ENTER 1 <GO> to UPDATE <PAGE FWD> for additional settings.

Bloomberg
TRADEBOOKʟʟᴄ

PROFILE SETTINGS FOR: TONY TANG
TRADEBOOK ID: 68817
頁 2 -: 3

TRADE SETTINGS
DISCRETION MINIMUM TRIGGER:
SEND OUT ADVERTISMENTS ON TRADE ?   Y   SEND IOI'S ?   Y

MONITOR SETTINGS
BTC/BTLM TICKER DISPLAY ?                T
BTC/BTLM TICKER LIST NAME:
BTC/BTLM SCROLL LINES:                   5 (1-15)
OPEN BOOK WHEN TRADE ?                   N
OFF-MONITOR NOTIFICATION ?               A
SINGLE SECURITY MONITOR TYPE:            O
DISPLAY PRICE AS DECIMAL ON BTMQ ?       Y
DISPLAY OPEN ORDERS FIRST ON BTBL ?      N
BTMQ/BTP CLICK DEFAULT                   C

TRADING DESK SETTINGS
ALLOW B-TRADE SRVS VIEW BLOTTER ?   Y
ENTER/CANCEL ORDERS ON YOUR BEHALF ?   Y
Please note: Changes to defaults do not update open orders

```
                                                              Equity BTP
At 14:00  Vol 1,060,700  Op 68⅛ Q  Hi 69⅛ Q  Lo 66⅝ Q  ValTrd 72120872
QR BMCS                                                            14:00
MQ
          DLJP ARCA    20  68³⁄₈  ↑  68½   24   MLCO FBCO WARR MASH BRUT
               GSCO    10  68¼      68⅜    2    NITE SLKC
          NEGOTIATE TO SELL                     NEGOTIATE TO BUY
AQR VWAP:              TSM Bid:       Ask:      RV 5-Day Avg Vol:

Total    Wtd Avg    Best Bids  TRADEBOOK  Best Offers    Wtd Avg    Total
  4000    68.094       1000      68³⁄₈   68½   1000
                       1000      68³⁄₈   68½   1000
14:10 R: 297000r       3000      68                      ← 134

Tradebook
ICN  BN  9/13 U.S. Equity Movers: Leap Wireless, Motorola, TheStreet.com
```

FIG. 17

BTRN                                                          N022 b Equity BTRN

```
┌─────────────────────────────────────────────────────────────────────┐
│            TRADEBOOK  DAILY  AUDIT  TRAIL       PAGE   1 OF   4     │
│   USER NAME: TONY TANG                                              │
│   TRANSACTION DATE:   9/29/1999                                     │
├─────────────────────────────────────────────────────────────────────┤
│ TESTA     Order flagged for NASDAQ quote -- 4000 shares      14:06:49
│ TESTA     Order flagged for Indications of Interest          14:06:49
│ TESTA     Order+ expires at 16:00:00                  }— 136 14:06:49
│ TESTA     Offer 4000 at 67.500 ; R 26000                     14:06:49
│ TESTA     Immediate or cancel order: 1000 filled, 299000 canceled  14:06:19
│ TESTA  S You SOLD (R) 1000 at 67.250                         14:06:19
│ TESTA     Offer* 1000 at 67.250 ; R 299000                   14:06:19
│ TESTA     Immediate or cancel order: 29400 filled, 270600 canceled 14:06:14
│ TESTA  B You BOUGHT(R) 29400 at 67.500                       14:06:14
│ TESTA     Bid* 1000 at 67.500 ; R 299000                     14:06:14
│ TESTA     Immediate or cancel order: 900 filled, 299100 canceled   14:06:10
│ TESTA  S You SOLD (R) 900 at 67.3125                         14:06:10
│ TESTA     Offer* 900 at 67.3125 ; R 299100                   14:06:10
│ TESTA     Immediate or cancel order: 114000 filled, 186000 canceled 14:06:07
│ TESTA  S You SOLD (R) 114000 at 67.375                       14:06:07
│ TESTA     Offer* 1600 at 67.375 ; R 298400                   14:06:07
│ TESTA  B You BOUGHT(R) 30000 at 67.500                       14:06:02
│ TESTA     Bid* 1000 at 67.500 ; R 29000                      14:06:02
│ TESTA  B You BOUGHT(R) 30000 at 67.500                       14:05:59
│ TESTA     Bid* 1400 at 67.500 ; R 28600                      14:05:59
└─────────────────────────────────────────────────────────────────────┘
```

FIG. 18

Backpage  DG61 a Equity I IA

| Indications & Advertisements: All indications and Advertisements Page | | | | | | 7 / 13 | |
|---|---|---|---|---|---|---|---|
| Side | AMT | Symbol | Price | Broker | Time | Trader | Cur |
| 1) BUY | S | TESTA US | 67⅛ | BTRD US | 12:44 | BTRD | USD |
| B-Trd Services 888-873-8873 | | | | | | | |
| 2) SELL | S | TESTA US | 67½ | BTRD US | 12:33 | BTRD | USD |
| B-Trd Services 888-873-8873 | | | | | | | |
| 3) BUY | M | STEI US | 5⅝ | BTRD US | 12:26 | BTRD | USD |
| B-Trd Services 888-873-8873 | | | | | | | |
| 4) SELL | M | SPNX US | 13⅛ | BTRD US | 11:59 | BTRD | USD |
| B-Trd Services 888-873-8873 | | | | | | | |
| 5) BUY | M | WCII US | 40¼ | BTRD US | 11:45 | BTRD | USD |
| B-Trd Services 888-873-8873 | | | | | | | |
| 6) BUY | M | WCII US | 40⅜ | BTRD US | 11:42 | BTRD | USD |
| B-Trd Services 888-873-8873 | | | | | | | |
| 7) BUY | S | TESTA US | 67¼ | BTRD US | 11:26 | BTRD | USD |
| B-Trd Services 888-873-8873 | | | | | | | |
| 8) SELL | S | YESM US | 11½ | BTRD US | 11:25 | BTRD | USD |
| B-Trd Services 888-873-8873 | | | | | | | |
| 9) BUY | L | TESTA US | 67 | BTRD US | 11:12 | BTRD | USD |
| B-Trd Services 888-873-8873 | | | | | | | |
| 10) BUY | S | TESTA US | 67½ | BTRD US | 11:03r | BTRD | USD |
| B-Trd Services 888-873-8873 | | | | | | | |
| 11) TRD | 40,000 | AERL US | 26⅝ | BTRD US | 11:01 | BTRD | USD |

ELECTRONIC TRADING SYSTEM SUPPORTING ANONYMOUS NEGOTIATION AND INDICATIONS OF INTEREST

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

The present invention relates to electronic trading systems, and, more particularly, to a system and method which acts as an introducing broker to arrange electronic trades in financial instruments.

Alternative trading systems are being implemented with capabilities beyond the traditional exchanges for commodities, stocks, and financial instruments. For example, electronic trading systems can perform trade-matching between buyers and sellers, which increases the communications and liquidity of capital for greater market efficiencies.

In the financial arts, electronic communications networks (ECNs) refer to computerized trade-matching systems which are capable of uniting the best bid and offer prices, as well as providing investors with anonymity and reduced transaction costs. For example, such ECNs may bypass broker-dealer commissions as well as exchange fees. An ECN allows its participants such as brokers/dealers, market makers, and buy-side institutions to post bids and offers into a market quote, such as the "NATIONAL ASSOCIATION OF SECURITIES DEALERS AUTOMATED QUOTATIONS" (NASDAQ) system.

Order handling rules have been implemented by the Securities and Exchange Commission (SEC), which mandate disclosure by market makers of any ECN order in a trade quote at the time of the trade. The lack of anonymity may expose, for example, excessive trades by specific institutions and companies which may, in turn, have a negative impact on the markets, such as causing runs in stocks and wild and volatile swings in markets. Accordingly, such exposure may chill trading by market makers of ECN orders, and so reduces liquidity and efficiency in trading systems.

A need exists for an anonymous trading system which complies with applicable market disclosure rules.

Trading systems also support messaging and displayed information as indications of interest (IOI) of an entity willing to enter into a trade and soliciting opposite parties or contras in a trade. Anonymous indications increase trading liquidity. However, on occasion brokers use s, and especially anonymous IOIs, to perform fishing; that is, to send empty or insincere IOIs to solicit half of a transaction, and then to seek to fill the other half.

OBJECTS AND SUMMARY OF THE INVENTION

Objects of this invention are to fill the needs described above.

These and other objects are achieved in accordance with the invention by an electronic trading system and method which support anonymous negotiation complying with order-handling rules, and which support indications of interest (IOI) while discouraging fishing IOIs.

In accordance with one embodiment of the invention, stocks are electronically traded using an electronic trading system while supporting anonymous negotiation and maintaining the identity of the trading parties anonymous with respect to each other and with respect to users of the trading system. In this embodiment, trades may be executed between two users of the system (between hidden orders) and between a user of the system and a third party (between a hidden order and a public order).

In accordance with this embodiment, a first party offers to buy or sell over the system a number of shares of stock selected by the first party at a price selected by the first party from or to one or more counterparties selected by the first party. In the preferred embodiment, anonymous negotiations may be conducted between a first party and a plurality of prospective counterparties (second users) selected by the first party. The first party and a counterparty electronically agree to trade up to an agreed number of shares of the stock at an agreed price. However, if there is no better trade in at least one stock order originating from outside the system for the particular stock for either the first party or the counterparty, the system electronically executes the trade agreed to by the first party and the counterparty, otherwise the system executes the better trade. A trade may be executed where the number of shares on the buy side of an order is less than on the sell side, with the system executing a trade for the number of shares on the buy side.

The first party offering to buy shares from or sell shares to one or more selected counterparties selects the one or more counterparties from the users identified by the system as engaging in recent trade or order activity in particular stocks. User stations may be provided having an input device and an output device, and available anonymous negotiation partners may be selected by a user from a list provided by the system using an input device. The first party and the counterparty electronically negotiate the price of the stock or the number of shares of the stock, or both, over the system prior to agreeing to the trade, and whether there is a better trade in the particular stock for either the first party or the counterparty is determined at least once during the negotiating step and at least once after completion of the negotiating step and before any trade is executed between the first party and the counterparty. Preferably this is determined repeatedly during the course of a negotiation.

Thus, a trade is not executed between users of the system if there is a better trade with a third party. Whether a better trade is available, i.e., whether there is a match of any one of the hidden orders with any one of the public orders, may be repeatedly determined. Depending upon whether a better trade is available, a pair of orders selected from the hidden orders and the public orders is executed. A trade is executed in accordance with a priority when the same trade becomes available between two orders originating within the system and an order originating from within the system and an order originating from outside the system. In the preferred embodiment, priority of trade execution is given to orders originating within the system.

In accordance with another embodiment of the invention, interest may be determined in a stock among users of an electronic stock trading system only in association with an order entered by a user. In this embodiment, the electronic trading system comprises at least one computer with associated computer memory and a plurality of user stations coupled thereto via a communications network. The at least one computer is programmed to match orders entered into the user stations by users and to execute trades of matched orders, and has a listing of system users accessible by any system user via a user station. Responsive to user input via user stations, the at least one computer is programmed to create a subset or profile of system users selected by a user to which that user authorizes the system to transmit an indication of interest (IOI) in a stock for which that user has entered an order. A user at a user station selects users from the list of users, and the system transmits the to the selected users only when the user enters an order at the user station for the particular stock. Thus, in this embodiment, an indication of interest (IOI) is transmitted only in association with an order entered by a user.

The IOI may be transmitted automatically in association with the order unless overridden by a command entered with the order, or pursuant only to a command entered with the order. The transmit or override command is preferably entered via a keyboard in the user station. Preferably, an IOI will be transmitted in association with an order only if the order exceeds a threshold quantity, or if that order and any uncancelled orders for the same stock entered by the same user exceed a threshold quantity.

The trading system includes a database for storing public orders received from a public stock trading system; and a server for receiving hidden orders from a plurality of users and for conducting anonymous negotiations between first and second users with the hidden orders. The server repeatedly accesses the database to determine a match of any one of the hidden orders with any one of the public orders, and to execute a pair of orders selected from the hidden orders and the public orders. The system also transmits indications of interest into a trading environment using the server for processing a trading order from a first user and for maintaining a profile of a user. The profile includes a current IOI setting for controlling transmission of the IOI from the user. The server responds to a toggle command from the first user to control transmission of the IOI opposite to the current IOI setting. The server responds to the IOI setting being set to allow transmission by transmitting the IOI of the first user associated with the trading order.

BRIEF DESCRIPTION OF THE DRAWINGS

FIG. 6 illustrates a screen display of a TRADEBOOK quote monitor;

FIG. 8 illustrates a screen display of available trades for negotiation;

FIG. 9 illustrates a screen display of FIG. 8 with trades selected for negotiation;

FIG. 10 illustrates a pop-up window for setting negotiation terms;

FIG. 11 illustrates a screen display of a TRADEBOOK negotiations monitor;

FIG. 12 illustrates the screen display of FIG. 11 with additional trades and their status;

FIG. 13 illustrates a pop-up window for accepting or declining a negotiated trade;

FIG. 14 illustrates the screen display of FIG. 12 with additional trades and their status as expired;

FIG. 15 illustrates a screen display for viewing the settings of a user's profile;

FIG. 16 illustrates the screen display of FIG. 15 with a pop-up window for changing a setting of a user profile;

FIG. 17 illustrates a screen display of multiple trades;

FIG. 18 illustrates a screen display of a log of daily trading activity; and

FIG. 19 illustrates a screen display of posted indications of interest.

DETAILED DESCRIPTION OF THE PREFERRED EMBODIMENT

Figure 1:
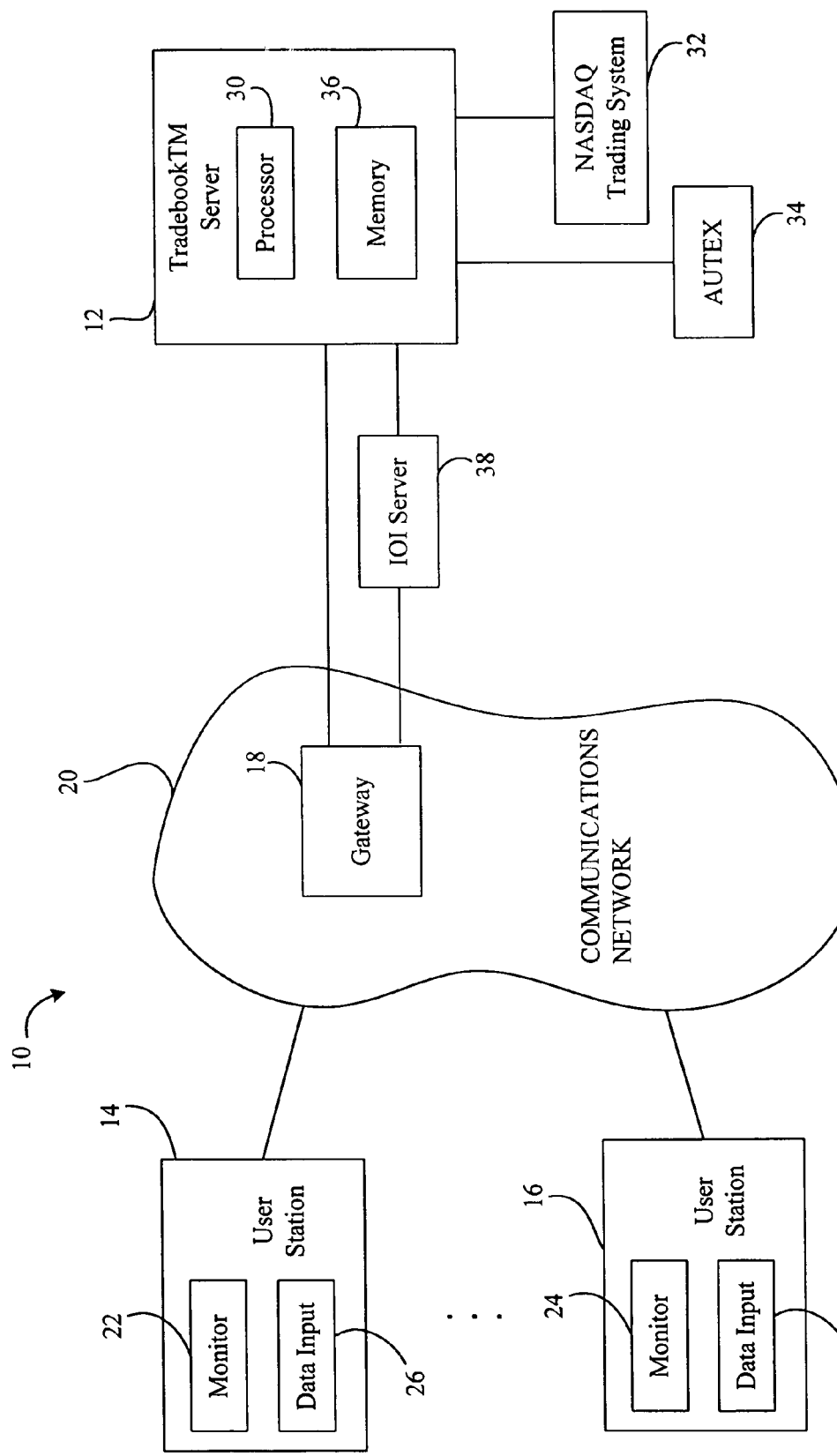
FIG. 1 illustrates the disclosed trading system.

Referring to FIG. 1, the disclosed trading system 10 includes a "TRADEBOOK" server 12 executing the "TRADEBOOK" software available from "BLOOMBERG TRADEBOOK LLC" to receive trading information from a plurality of users using the user stations 14-16 through a gateway 18 and a communications network 20, which may be, for example, an intranet, or a public services telephone network (PSTN). Alternatively, the communications network 20 may be the Internet. In addition to the gateway 18, the system 10 and/or the communications network 20 in any embodiment may provide appropriate data security; for example, using encryption and firewalls.

The server 12 displays information on stocks and other securities to the users through the monitors 22-24, and the users may enter selections and commands such as buy and offer messages using the data inputs 26-28, which may be input devices which may include a keyboard, a mouse, or other input devices such as a graphic user interface (GUI).

The server 12 includes a processor 30 for executing the "TRADEBOOK" software to conduct trading with anonymous negotiation and indications of interest features as described herein, such that the system 10 acts as an introducing broker to arrange transactions with the "NASDAQ" trading system 32 and/or the "AUTEX" system 34. The "TRADEBOOK" software may be stored in the memory 36 and is capable of acting as an agent for both sides of each trade, with fees charged to both participants and non-participants of the system 10 on a per-transaction-basis. The securities which may be traded on the system 10 may include NASDAQ, NASDAQ Small Cap, and exchange-listed U.S. equity securities, as well as American Depository Receipts (ADRs), such as pink sheet and bulletin board types of securities which are eligible for continuous net settlement by book entry through the National Securities Clearing Corporation and the Depository Trust Company.

In an alternative embodiment, the system 10 may include an indication of interest (IOI) server 38, shown in FIG. 1, for processing IOIs through the TRADEBOOK server 12, as described herein, to provide IOI functionality to the "BLOOMBERG TRADEBOOK" system 10 and to users thereof.

Figure 2:
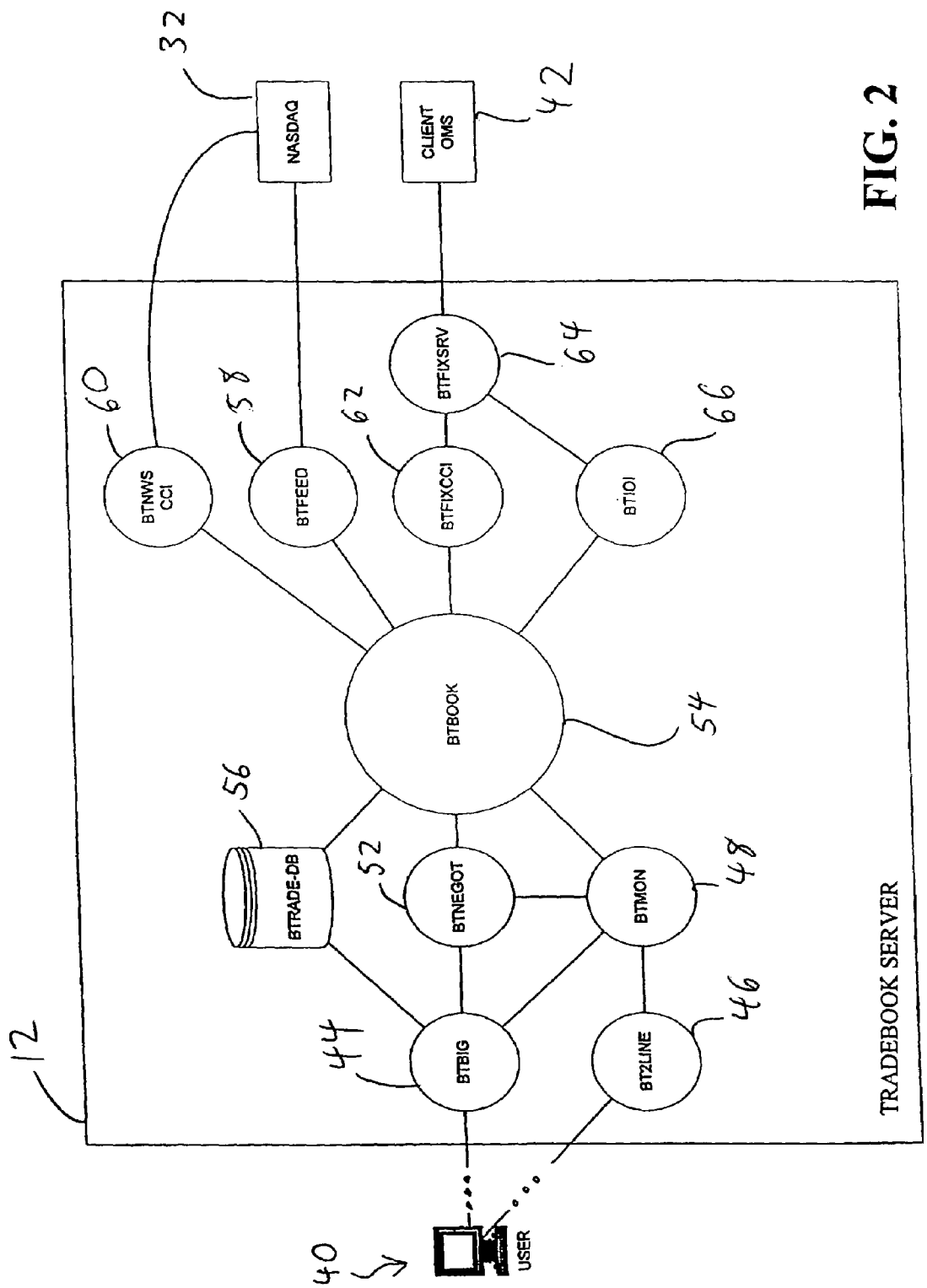
FIG. 2 illustrates the system of FIG. 1 in greater detail with modules used for negotiated trades.

Referring to FIG. 2, the TRADEBOOK server 12 includes various modules, which may be hardware and/or software, for processing TRADEBOOK orders and data and for interfacing the users 40 using the user stations 14-16 to the NASDAQ trading system 32 as well as to other systems such as a client's open market system (OMS) 42. The modules may be referenced with file names and/or designations beginning, for example, with "BT" for "BLOOMBERG TRADEBOOK".

User inputs and data from the uses 40 and user stations 14-16 are processed in real-time using the processor 30 executing the BTBIG module 44 and the BT2LINE module 46, which receive and format the input data for orders and messages for use by the TRADEBOOK server 12. Data to be displayed back to the user 40 is sent to the BTMON module 46, which is a monitoring module for translating information to the format used by BTBOOK 54 and for sending output data to the monitors 22-24 and for controlling the data displayed on the monitors 22-24 of the user stations 14-16, respectively. The monitors 22-24 provide outputs to respective users through portions 50 of the screen, with the BTBIG module 44 for processing data from the lower portion of the screen, and the BT2LINE module 46 for handling and displaying the data from the first two lines in the upper portion of the screen, shown in FIG. 6.

FIG. 6 illustrates a typical "BLOOMBERG TRADEBOOK" screen display for use by traders to efficiently and quickly provide a significant amount of up-to-date information upon entry of simple commands. In addition, the activation of commands and the display of additional information is also provided by using a GUI with GUI-based input devices such as a mouse. For example, text, numbers, and regions of the screen may be active for actuation by the user. In one example, double-clicking the stock name "INTC" may generate a chart of activity of prices of the "INTEL CORPORATION" stock. In another example, double-clicking a mouse over the market maker name "BTRD" may generate information about the market maker, such as the full name and contact information, in which "BTRD" corresponds to "BLOOMBERG TRADEBOOK" as the source of the 62.5 bid for 70,000 shares of INTC shown in FIG. 6.

The particular example screen shown in FIG. 6 is a TRADEBOOK quote monitor screen which is generated by the trader entering the command BTMQ which may stand for "BLOOMBERG TRADEBOOK" market (or monitor) quote, with the command mnemonic "BTMQ" which generated the present screen in FIG. 6 being displayed, for example, in the upper right corner of the screen of FIG. 6. Other types of screens may be provided to users of "BLOOMBERG TRADEBOOK", such as screens showing order tickets, order blotters, monitoring of a single security, monitoring of a composite or set of securities in one's portfolio or field of trading, and multiple buy and sell orders in the same security.

Referring to FIG. 2, the BT2LINE module 46 of the system 10 displays input commands back to the user. For example, to buy 10,000 shares of "INTEL CORPORATION" shares having the trading symbol INTC at $62 per share, a user 40 may input the command line:

<BUY> INTC 10000 62 <GO> through the data input 26. The keywords <BUY> and <GO> may be input as text, or may be predetermined hotkeys or function keys or combinations thereof on a standard keyboard, or alternatively may be specialized keys on a customized keyboard available, for example, through "BLOOMBERG LP". For example, the <GO> command may be the traditional ENTER or RETURN key, or may be a customized keyboard button with the word "GO" imprinted as indicia thereupon. The indicated command line is processed by BT2LINE 46, which in turn is processed by BTMON 48 to display the command on a tool line, for example, at the top of a predetermined displayed screen through the monitor 22 as shown in the example screen shown in FIG. 6.

Figure 4:
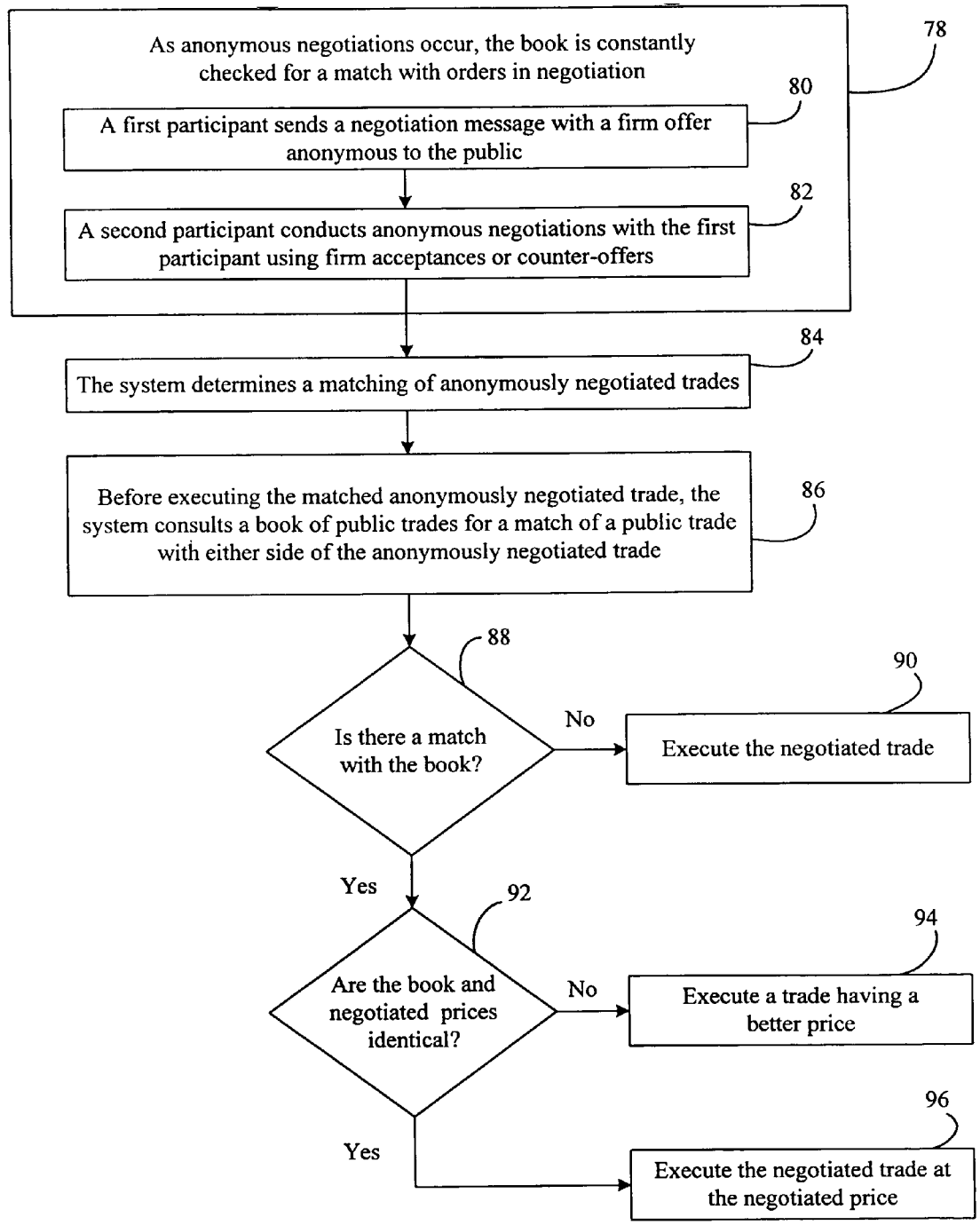
FIG. 4 illustrates a flowchart for performing negotiated trades.

Any input commands such as orders corresponding to negotiations between traders are processed through a BTNEGOT module 52 which processes the negotiation messages as described herein in conjunction with FIG. 4. BTNEGOT 52 consults a book of trades processed by the BTBOOK module 54 and stored in the memory 34, which may be a database such as the BTRADE-DB 56, which is accessible by the BTBOOK module 54. Through BTBOOK 54, the book in BTRADE-DB 56 is updated to reflect orders, current prices, and data available from the NASDAQ trading system 32, as well as cancellations of orders and logs of activity. In particular, the BTBOOK module 54 is operatively connected to the NASDAQ trading system 32 through a BTFEED module 58, which feeds data such as order and quote data from NASDAQ 32. In addition, the BTBOOK module 54 is connected to the SELECTNET system of NASDAQ 32 through a "BLOOMBERG TRADEBOOK" NASDAQ WORKSTATION (BTNWS) computer-computer interface (CCI) 60, which connects BTBOOK 54 to SELECTNET to receive and transmit orders.

BTBOOK 54 also receives order and trading data from the client OMS 42 through a BTFIXCCI module 62 and a BTFIXSRV module 64, which are respectively a financial information exchange (FIX) CCI application and a FIX receiver application for feeding financial data to BTBOOK 54. In particular, the BTFIXCCI module 62 translates and/or formats the received financial data to a format for use by BTBOOK 54. The BTFIXSRV module 64 acts as a local node for the TRADEBOOK server 12 for identification of the server 12 with other systems and components.

Since trades may also be associated with indications of interest (IOI), BTBOOK 54 may optionally be connected to a BTIOI module 66 for processing IOIs in conjunction with trades with anonymous negotiations through BTNEGOT 52. The BTIOI module 66 may be connected to the IOI server 38 shown in FIG. 1.

Figure 3:
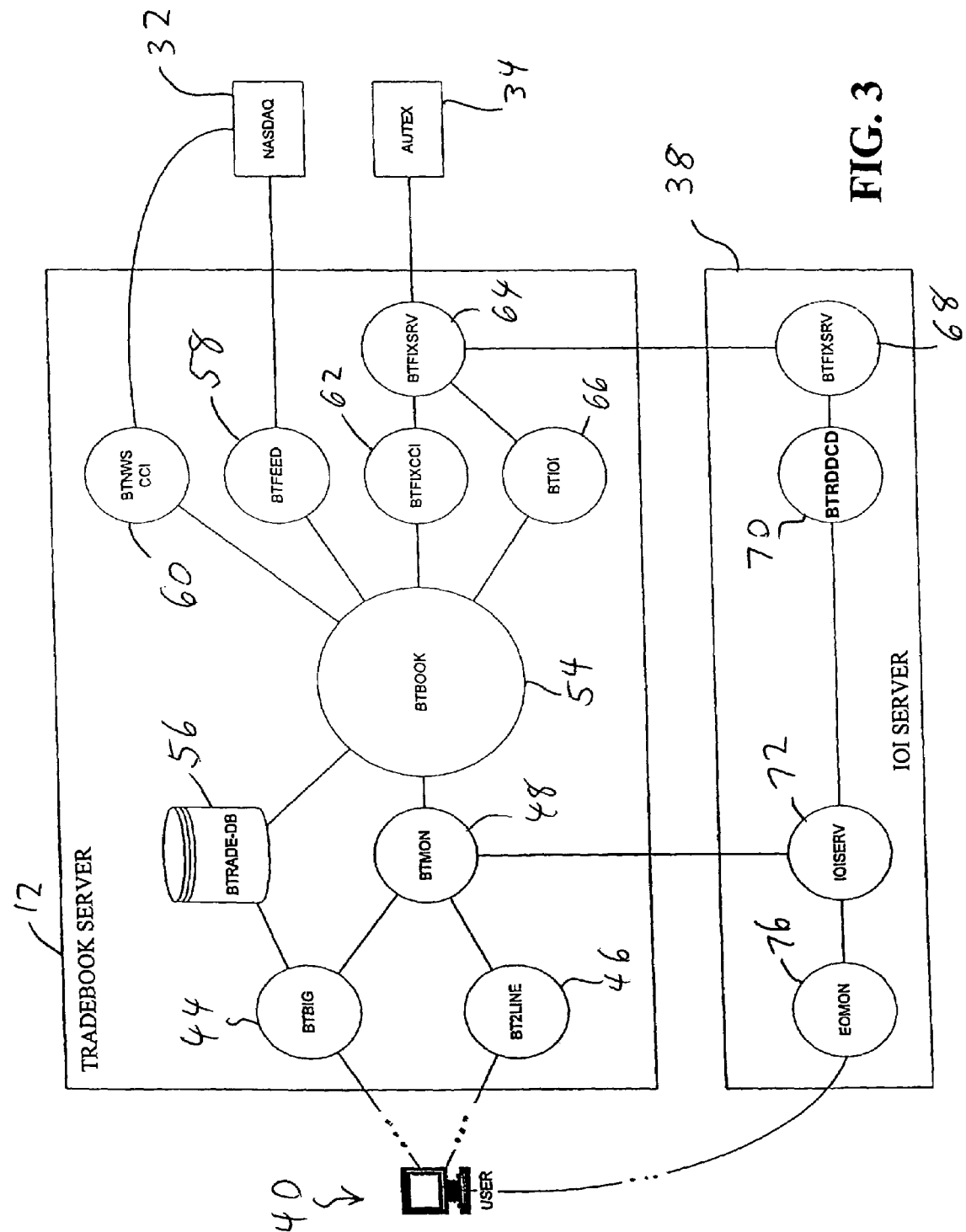
FIG. 3 illustrates the system of FIG. 1 in greater detail with modules used for processing indications of interest.

In an alternative embodiment shown in FIG. 3, the TRADEBOOK server 12 may support IOI associated with trades executed without anonymous negotiations. For example, the BTIOI module 66 may be connected to the IOI server 38 through the BTFIXSRV module 64 of the TRADEBOOK server 12 and also to the AUTEX automatic trade execution system 34. The IOI server 38 may be connected to the user 40 through the communications network 20 and to the TRADEBOOK server 12 through various modules. For example, the IOI server 38 may include a corresponding BTFIXSRV 70 which interfaces with the BTFIXSRV 64 to access and to post IOIs to the AUTEX system 34.

A corresponding BTFIXSRV module 68 connects the IOI server 38 to external systems such as the TRADEBOOK server 12, and so the BTFIXSRV module 68 identifies the IOI server 68 to such external systems. The BTFIXSRV modules 64, 68 may be identical in implementation. The IOI server 38 of "BLOOMBERG TRADEBOOK" (BTRD) includes a decoder (BTRDDCD) module 70 which performs auto-execution of the IOI software to take messages received through the BTFIXSRV module 68 and to translate such messages into a format for use by the IOISERV module 72 to process the IOIs.

The IOISERV module 72 also posts the IOIs for display with associated data to the monitor of the user 40 through an equity order monitor (EOMON) module 76 separate from the monitor module BTMON 52 of the TRADEBOOK server 12. In particular, the EOMON module 76 may be configured to filter IOIs according to the settings of each particular user, for example, to prevent the display of certain brokers.

At the request of the user, the IOISERV module 72 also causes the display of all IOIs. In addition, the BTMON module 48 operates with the IOISERV module 72 to determine and to display, for each particular user, the most recent IOIs involving the particular user, such as the two most recent IOIs sent by the user.

Anonymous Negotiations

In operation, as shown in FIG. 4, the system 10 supports negotiation features, which allow broker-dealers and institutional participants to initiate anonymous negotiations on a one-on-one basis with other participants of the system 10. A participant may designate whether or not to receive negotiation messages, and may initiate a negotiation with another participant having an open order, an expired order, or an executed trade on the system 10. Such negotiations may be performed in conjunction with the indications of interest (IOI) feature of the system 10, as described herein.

When a trader enters an order, the processor 30 of the TRADEBOOK server 12 using, for example, BTBIG 44, checks the book of orders in BTBOOK 54 reflecting NASDAQ orders for a match to the trader's order. If no match exists, anonymous negotiations may occur, as shown in step 78 of FIG. 4, with the book being checked constantly and/or regularly for a match with the negotiated orders.

Figure 7:
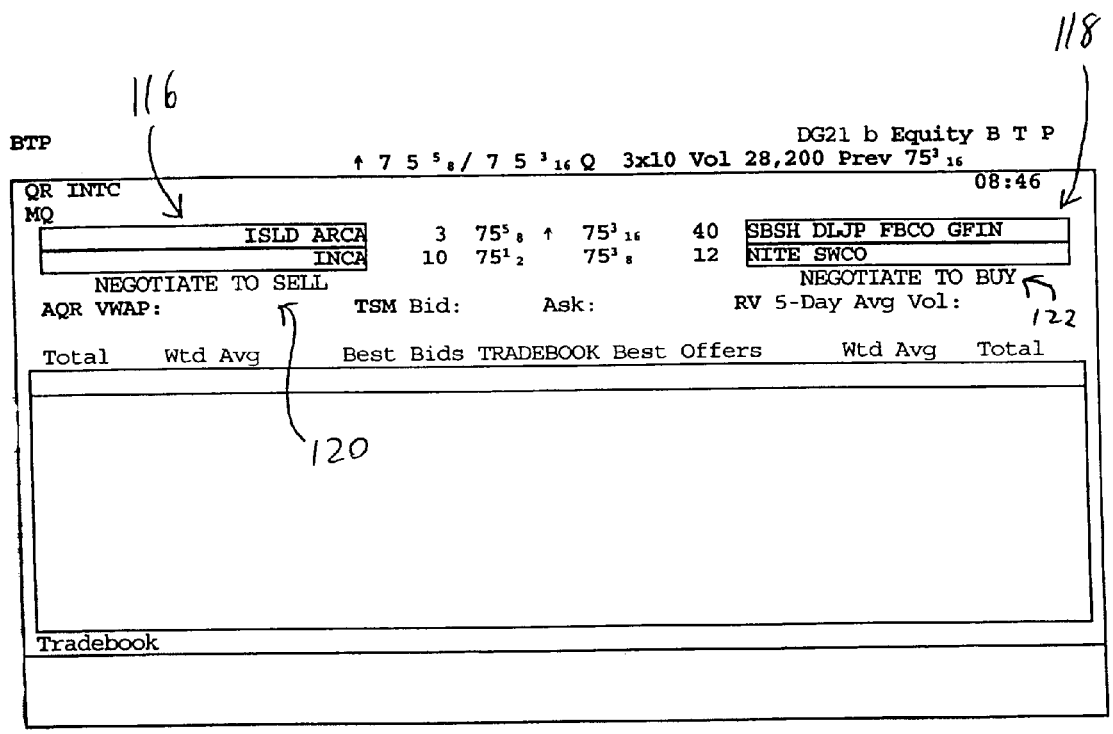
FIG. 7 illustrates a screen display showing stock price status.

By entering a "BTP" command, a trader is then presented with a BTP stock price status screen shown in FIG. 7, which lists for the indicated stock, such as INTC for "INTEL CORPORATION", the most recent activity of the stock such as orders for selling and buying in screen portions 116-118, respectively. If the trader viewing the status screen of FIG. 7 wishes to negotiate to buy or sell an unmatched order, the trader may select and actuate the commands "NEGOTIATE TO SELL" or "NEGOTIATE TO BUY", at screen portions 120-122, respectively. For example, the trader, as the first participant of the negotiation, may use a predetermined function key, or may actuate, through a GUI, the text at portions 120-122.

For example, for negotiating to buy the INTC stock, activation of text 122 causes BTNEGOT 52 to generate the Negotiate-to-Buy screen shown in FIG. 8 for display on the respective one of the monitors 22-24 associated with the first participant. The Negotiate-to-Buy screen may display the total shares bought that day by the first participant, and the quantity of shares of the first participant displayed to others.

On the screen shown in FIG. 8, the most recent trading activity of orders for the stock, for example, INTC, is displayed with the date, quantity, and price. The first participant may select one or more of the orders to engage in negotiations, for example, by actuating the empty box icons 124 through a GUI. The empty boxes are then changed to filled or X-ed boxes 126 as shown in FIG. 9. The first participant may select any number of available orders for negotiation, or alternatively only a predetermined number of orders may be selected, such as eight or ten.

During negotiation, a participant enters a firm negotiation order in step 80 of FIG. 4, which is an order which results in a trade if accepted by the recipient of the negotiation message. To enter the negotiation order, for example, for a negotiation to buy, the system 10 generates a pop-up window 128 or sub-screen, such as shown in FIG. 10, for inputting a negotiation price as well as limits to exposure of the first participant in the negotiations. For example, as shown in FIG. 10, Participant A sends a negotiation message to sell 50,000 shares of a designated security at, for example, $84.25 per share to Participant B and other participants who entered the sale orders in FIG. 9. Through the pop-up window 128 of FIG. 10, the first participant may limit his/her trading exposure to 60,000 shares. A second participant such as Participant B may then conduct anonymous negotiations with the first participant using firm acceptances or counter-offers in step 82 of FIG. 4.

Once negotiations have begun, the first participant who initiated the negotiation may view the action on the negotiation through a negotiations monitor screen shown in FIG. 11. As responses from other participants provide counter-offers or acceptances, such action is also then displayed on the negotiations monitor screen of the first participant shown in FIG. 12. The first participant may then select which counter-offer or acceptance to accept or decline by actuation of the respective text in FIG. 12 using a GUI. For example, when the first participant double-clicks a mouse when a cursor is positioned over action number 1 of FIG. 12 with an offer for 3000 shares at a price of 77 from a second participant, a pop-up window 130 is generated as shown in FIG. 13. Using the window 130 in FIG. 13, the first participant can accept or decline the offer of 3000 shares at 77, and the negotiation in that instance is then complete. If the negotiation is accepted on both sides, then the order is executed automatically unless there is a match with the book of public orders.

As shown in FIG. 14, the various orders may have time limitations for matching, negotiation and/or acceptance. Accordingly, stale negotiations may be cancelled as expired, as in action items 3-4 in FIG. 14. The first participant may re-initiate negotiations on different terms, such as the more favorable prices of 77 per share as shown in action item 1 in FIG. 14.

In the described example with Participant A, if Participant B responds to the negotiation message to buy only 20,000 shares of the offered security at the offered price, the server 12 matches the two orders in step 84 of FIG. 4, and a trade for the 20,000 shares is executed without further action by either participant if no match is in the book as per steps 86-90.

Alternatively, if Participant B responds to the negotiation message with a counter-offer in step 82 instead of communicating an acceptance, the counter-offer may also to be a firm offer, and may propose a different quantity and/or a different price per share for the same security. In other alternative embodiments, the offers, acceptances, and counter-offers may not be firm and so may be subject to confirmation by the last accepting party.

All negotiation initiators and counter-offerors may be required to enter and accept firm quantities and firm prices to ensure that the participants conduct good-faith negotiations and so to prevent participants from testing the waters; for example, by sending insincere negotiation bids or offers, or even counter-offers, and then backing out of the trade if the contra-side participant communicates an acceptance.

A negotiation order may be all-or-none as to terms, may specify a minimum which is to be taken, or may state that the initiator of the negotiation is open to a counter-offer with a quantity of a different size. The system 10 may also support the use of reserves for trading; for example, if Participant A's negotiation order is over a predetermined threshold, such as 10,000 shares, Participant A may designate a reserve, which is not displayed to Participant B who received the negotiation message. During negotiation in which Participant A sends an order with a displayed quantity and a non-displayed reserve quantity, if Participant B responds with a counter-offer indicating a match on price but with a quantity which is greater than the displayed quantity yet within the total reserve amount, then the reserve of Participant A is automatically drawn to allow the trade to go forward to meet the quantity of the counter-offer.

However, using reserves, if the counter-offer quantity exceeds the reserve quantity, the counter-offer is executed up to the amount of the reserve, unless the counter-offer is specified by Participant B as being all-or-none. In an all-or-none situation, execution does not occur without a subsequent communication from Participant A of an increase in the offered display quantity or of an increase in the reserve quantity.

When a trader sets a cap for his/her exposure, such as 10,000 shares split among multiple parties in negotiation, the system 10 ensures that the cap is not exceeded during negotiation by hidden messages and during trading with the public trades in the book. In particular, the caps are enforced by determining when the cap is met or would be exceeded by additional trades, and then by canceling all outstanding hidden messages reflecting orders which exceed or would exceed the cap.

Negotiation orders are independent of other displayed orders on the system 10 unless the negotiation process is complete. When a negotiation order is initially entered by Participant A using, for example, user station 14 of FIG. 1 through a data input device 26, the displayed portion of the negotiation order is only displayed to the participant designated by the initiator of a trade, but the negotiated order is capable of interacting with publicly displayed orders, for example, during matching, when such orders are at the same price.

For example, if the best displayed bid in the system 10 is at 84.25 and the negotiation bid is entered at 84.375, a subsequent offer entered into the system 10 by the participant at 84.375 automatically hits the 84.375 negotiation bid, up to the full amount of the negotiation quantity and reserve. Such matching and hitting of bids occurs even for anonymous and/or invisible bids. For example, although the negotiation bid in the above example is not displayed to the participant as part of the anonymous negotiation method, the negotiation bid is still able to be matched with the 84.375 offer.

The negotiation feature using anonymous bids and offers is intended to comply with the ECN Alternative for alternative trading systems specified in Order Execution Rules of the Securities and Exchange Commission (SEC), which do not require an order in an alternative trading system to be displayed publicly if the order is shown only to one other person or entity. For example, the Exchange Act Release No. 40760 of Dec. 8, 1998, published at 63 Federal Register 70844 on Dec. 22, 1998, states after note 190 that "alternative trading systems are not required to provide the public quote stream orders displayed to only one other alternative trading system subscriber, such as through the use of a negotiation feature". The system 10 using the "TRADEBOOK" server 12 executing the "TRADEBOOK" software available from "BLOOMBERG TRADEBOOK LLC" may be used as or in conjunction with an alternative trading system for allowing users to negotiate orders for the "NASDAQ" trading system 32.

Accordingly, while negotiations occur anonymously using hidden orders in steps 78-84 shown in FIG. 4 after no initial match of booked public orders, orders may enter the book during the anonymous negotiations. While the anonymous negotiations occurs, the system 10 continues to consult the book of public trades in step 86 for a match of a public trade with either side of the anonymously negotiated trade. In step 88, the system 10 determines if there is a match of one party in the anonymous trade with the book 36. If not, for example, if the company stock or the type of company stock of the negotiated trade differ from every entry in the book 36, then no match with the book 36 exists and so the negotiated trade is executed in step 90.

However, if there is a matching trade in step 88, the system 10 determines if the prices of the book trade and the negotiated trade are identical in step 92. If not, the trade having the better price is executed in step 94. For example, Participant A is interested in buying 10,000 shares of INTEL at 62, and has negotiated with Participant B to buy the shares of INTEL at 64. After negotiations are finalized, if an order in the book 36 is present from Participant C to sell 10,000 shares of INTEL at 63, then from the perspective of Participant A, Participant C has the lower and therefore better price of 63 per share instead of 64 per share from Participant B. Accordingly, despite negotiations with Participant B, a trade between Participants A and C is executed at the better price of 63.

After anonymous negotiations, the terms of the trade may be identical to a later book entry, including identical in price. Therefore, in step 92, the prices are identical, but the negotiated trade takes precedence so the system 10 executes the negotiated trade at the negotiated price 96. In this matter, the system 10 maintains price/time priority, in which the best price governs the trade and, if prices are identical, the negotiated trade is deemed to have time priority over a later-received trade in the book 36. Accordingly, traders having identical trades with later book trades are not penalized for entering into negotiations.

Any parties rejected during negotiation may later propose new trades and so may enter into the final trade outside of negotiation as per steps 86-96. For example, Participant A selects Participants B and C for anonymous negotiation, but finalizes an anonymously negotiated trade with Participant B. Participant C is thus rejected during negotiation, but may re-enter a trade in the book 36. During steps 86-88, despite the negotiation between Participants A and B, the negotiated trade is compared to the publicly booked trade of Participant C. If Participant C can beat the price of Participant B in step 92, then Participant C may enter into the final trade with Participant A at the better price.

Accordingly, trading and liquidity are improved by the system 10 using anonymous negotiations which comply with appropriate regulatory market rules for improved prices and market efficiency.

Indications of Interest

Referring to FIG. 3, the system 10 also supports the use of an indications feature which allows only certain participants (e.g., institutional participants) to advertise a desire to negotiate by sending indication of interest (IOI) messages to other institutional participants via IOI software applications or services. Such indications may specify only the security ticker and the side of the indication as being for a buy or a sell, and may also include a notation that the security is negotiable on the system 10. Indications may be set to not show any price, size, or identification of the participant.

The system 10 maintains user profiles to control the transmission of IOIs, with a default setting permitting transmission by any particular user. These profiles are in effect subsets of system users to which a user wants IOIs to be transmitted by the system. A user accesses a list of users from which the user creates the profile. In the preferred embodiment, the system 10 also supports the use of IOIs only between institutional traders and not from individual brokers, in order to reduce or eliminate "fishing" for interest. The user profile may specify whether or not the user is an institution. The user profile may be modified by the user to change the IOI default setting, but may not be modified by the user to change the user's designation of being or not being an institutional trader.

Figure 5:
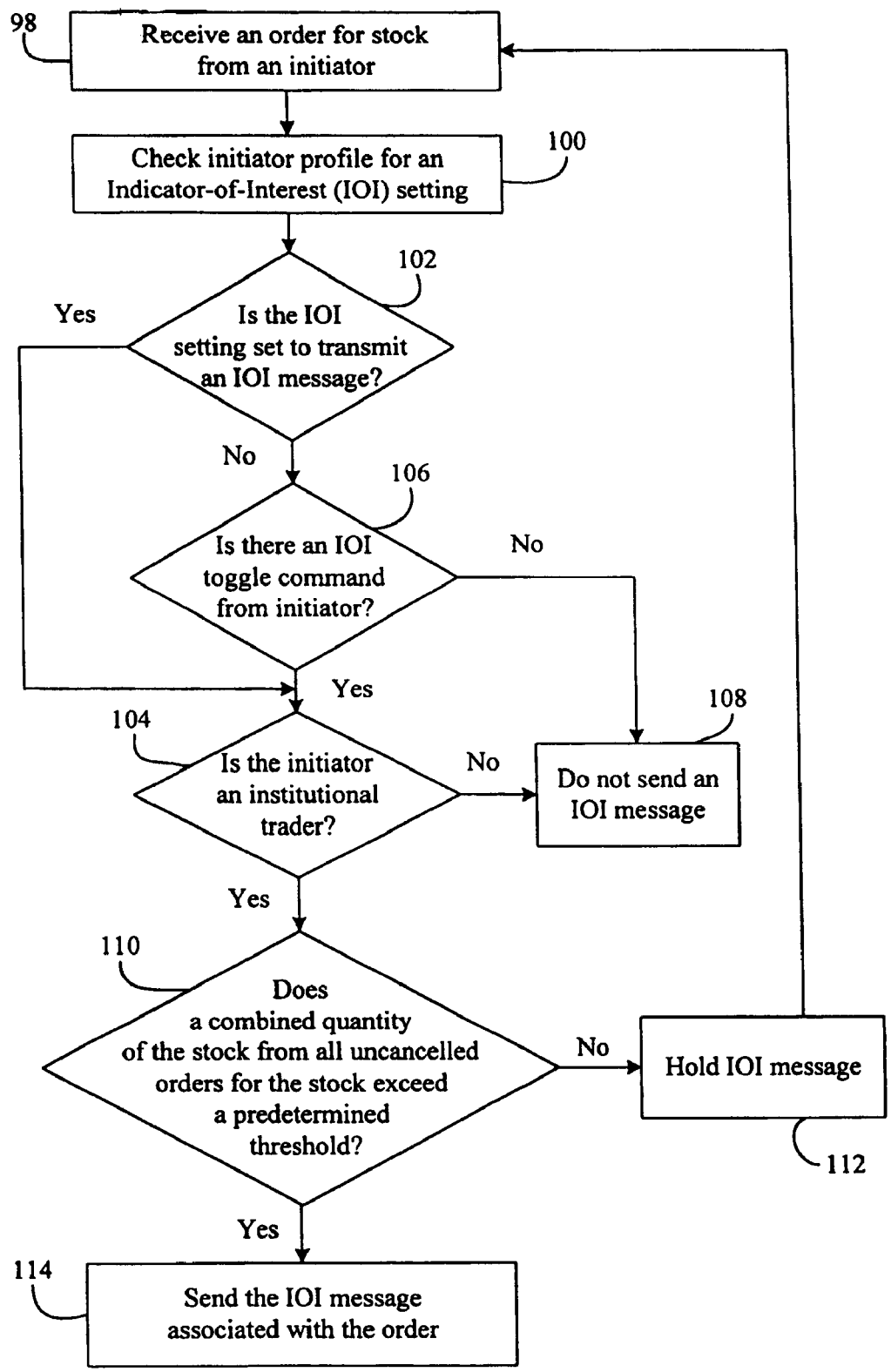
FIG. 5 illustrates a flowchart for processing indications of interest.

As shown in FIG. 5, the system 10 uses the components and modules of FIGS. 1 and 3 to a perform the steps 98-114. Upon receiving an order for stock in step 98 from an initiator of the trade, the system 10 checks the user profile of the initiator in step 100 to determine the present value of the IOI setting, which may be the default value or a customized setting. If the IOI setting is determined in step 102 as being set to transmit an IOI with the trade, then the method proceeds to step 104.

Otherwise, the system 10 determines in step 106 whether the initiator has entered an toggle command to override the current IOI setting in the initiator's profile. For example, when entering an order in the tool line 50 of FIG. 6, the initiator may include a "/N" command, such that the order shown in FIG. 6 instead reads:

<BUY> INTC 10000 62 /N <GO> which toggles the system 10 to use, for this trade only, the exact opposite of the IOI setting in the initiator's profile. The "N" in the "/N" command represents NATURAL Institution-to-Institution-Only Indications of Interest. Accordingly, the initiator of orders need not continuously reset the IOI setting in the user's profile to transmit IOIs. It is understood that other commands, function keys, or hotkeys may be used to toggle the initiator's profile settings.

If no toggle command is present and the IOI setting is set to not transmit an IOI message as determined in steps 102 and 106, then the system 10 in step 108 does not send an IOI message. However, in step 106, if a toggle command is present in step 106 to use the opposite of the IOI setting to not transmit as determined in step 102, then the system proceeds to step 104.

In step 104, the system 10 may optionally determine if the initiator is an institutional trader, for example, by checking the profile of the initiator which may include a designation or flag indicating whether or not the initiator is an institutional trader. If the initiator is not an institutional trader, then the system 10 performs step 108 to not send the IOI message, since such IOI functionality is reserved for institutional traders to prevent fishing for trades, as described herein.

However, in step 104, if the initiator is an institutional trader, then the system 10 determines if a combined quantity of the stock from all uncancelled orders for the stock exceeds a predetermined threshold in step 110. For example, the system 10 may support IOIs which involve a combined total of, for example, 10,000 shares of a given stock, in order to ensure that enough overall interest is present for serious institutional traders to enter into trades of the stock.

If the predetermined threshold is not met in step 110, the system 10 holds the IOI message in step 112 for every initiator and returns to step 98 to receive more orders for the stock. Otherwise, in step 110, with the predetermined threshold met, the system 10 sends the IOI message associated with the order or orders of the particular stock in step 114.

Figure 16:
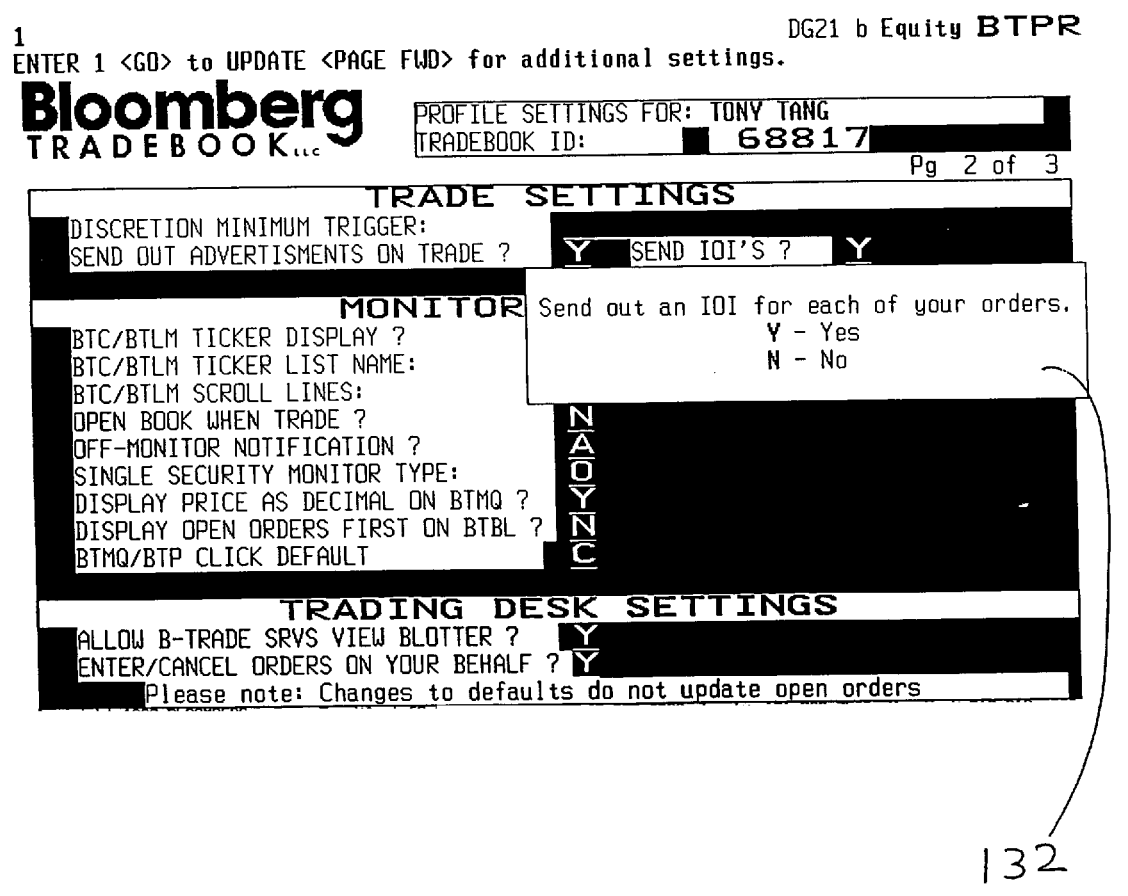

As shown in FIG. 15, the system 10 responds to a command from a user to display a screen on the respective monitor 22-24 of the user for viewing the settings of a user's profile, such as the setting for sending out IOIs. Using a mouse and GUI as the data inputs 26-28 for moving a cursor to the "Y" in a field adjacent to the "SEND IOIs" setting, or alternatively using highlighted portions of the screen of FIG. 12 with a cursor moved by tabs or other keystrokes through a keyboard, a user can select the field and so to cause the system 10 to generate a change-of-setting pop-up window or menu 132, as shown in FIG. 16. Once the user inputs a new setting, the change of setting is confirmed by the user using, for example, the GO key and/or other predetermined keys or keystrokes, which causes the updated setting to be stored with other settings in the memory 36. Thereafter, the system 10 responds to the updated IOI setting as the current IOI setting.

By entering a "BTP" command, a trader is then presented with a BTP stock price status screen shown in FIG. 17, which lists for the indicated stock the most recent activity of the stock such as orders for selling and buying in screen portions 116-118, respectively, as well as best bids and best offers in screen portions 134. Upon entering a predetermined command such as BTRN, the trader is then presented with an audit trail screen as shown in FIG. 18, in which any activity corresponding to the text at the screen portions 134 in FIG. 17 are indicated, for example, in text messages 136 shown in FIG. 18. In particular, any IOIs associated with the orders in FIG. 17 are displayed.

In response to an IOI display command from a trader, such as IIA<GO>, the system 10 displays all IOI messages on an IOI screen shown in FIG. 19, with the IOI in FIG. 18 associated with the buy order of 68.5 per share in FIG. 17 being shown in more detail as the IOI 138 in FIG. 19.

Unlike traditional broker-dealer IOIs in the prior art, the disclosed IOIs are fully executable and associated with the actual order. The IOIs are anonymous, and may be sent for both listed and over-the-counter stocks and only to institutions over both the "BLOOMBERG LP" and AUTEX systems. In one embodiment of the disclosed system 10 using the TRADEBOOK server 12 and applications, the only permissible way to enter and send an IOI is by entering an order to be associated with the IOI in the TRADEBOOK system. Accordingly, any user of the system 10 seeing an IOI knows that there is a real TRADEBOOK order attached to the IOI, and so the IOI is not being used for fishing for orders and trades.

Such IOI functionality may only be available to the buy-side, so only the buy-side has the ability to view brokers' IOIs. Using commands associated with TRADEBOOK such as broker:BTRD, users are allowed to view the available and posted IOIs, and so users of the system 10 may engage in trades using IOIs with confidence that the initiator is not fishing and wasting the users' time. Thus the IOIs represent real liquidity which is immediately executable.

The disclosed trading system 10 and method have been described by way of the preferred embodiment. However, numerous modifications and substitutions may be made without departing from the spirit of the invention. For example, while the preferred embodiment discusses trades complying with NASDAQ trading rules, it is wholly within the purview of the invention to contemplate negotiation and processing of trades under different market rules to ensure anonymity yet comply with the market rules in the manner as set forth above. Accordingly, the invention has been described by way of illustration rather than limitation.

The invention claimed is:

1. A method for electronically trading stocks using an electronic trading system while maintaining the identity of the trading parties anonymous with respect to each other and with respect to users of the trading system, comprising:

a first party offering to buy or sell over the system a number of shares selected by the first party of a stock at a price selected by the first party from or to one or more counterparties selected by the first party;

the first party and a counterparty electronically agreeing to trade up to an agreed number of shares of the stock at an agreed price;

if there is no better trade in at least one stock order originating from outside the system for the particular stock for either the first party or the counterparty, the system electronically executing the trade agreed to by the first party and the counterparty, and if there is a better trade in at least one stock order originating from outside the system for the particular stock for either the first party or the counterparty, the system executing the better trade.

2. The method of claim 1 including the system identifying users who have engaged in recent trade or order activity in particular stocks, and wherein the first party offering to buy shares from or sell shares to one or more selected counterparties includes selecting the one or more counterparties from the users identified by the system.

3. The method of claim 1 comprising the first party and the counterparty electronically negotiating the price of the stock or the number of shares of the stock, or both, over the system prior to agreeing to the trade.

4. The method of claim 3 comprising determining if there is no better trade in the particular stock for either the first party or the counterparty at least once during negotiating and at least once after completion of negotiating and before any trade is executed between the first party and the counterparty.

5. The method of claim 1 comprising users of the system selecting counterparties to whom the system automatically electronically conveys orders of respective users.

6. The method of claim 1 wherein agreeing to trade up to an agreed number of shares of stock includes agreement by the first party and the counterparty to trade for less than the full number of shares offered at an agreed price.

7. A system for conducting anonymous trades of stock, including:

at least one computer with associated computer memory which receives anonymous orders from a plurality of users of the system, and is programmed to support anonymous electronic negotiations between a first user and a second user of the system for a trade of a stock;

the at least one computer also receiving stock orders originating from outside the system and being programmed to electronically execute:

a trade of matching orders of users of the system;

a trade of an order from a user of the system matched with an order originating from outside the system;

a trade negotiated by a first and a second user of the system in accordance with at least price and quantity terms agreed to by the first and second users;

a trade of an order of a first user of the system to a negotiated trade agreed to by the first user and a second user of the system and an order originating from outside the system; and a trade of an order of the second user of the system to the negotiated trade and an order originating from outside the system;

the at least one computer being programmed to execute a trade in accordance with a priority when the same trade becomes available:

between two orders originating within the system, and between an order originating from within the system and an order originating from outside the system.

8. The system of claim 7 wherein the at least one computer is programmed to provide priority of trade execution to orders originating within the system.

9. A system for conducting anonymous negotiations in trading stock comprising:

at least one computer with associated computer memory which receives orders from a plurality of users and orders originating from outside the system, the at least one computer being programmed to:

support anonymous negotiations between first and second users with orders;

to repeatedly determine whether there is a match of any one of the orders from the first and second users with any one of the orders originating from outside the system; and to execute a pair of orders selected from the orders from the first and second users and the orders originating from outside the system.

10. The system of claim 9 wherein the pair of orders includes orders of the first and second users paired by anonymous negotiation and by acceptance by the first and second users.

11. The system of claim 9 wherein the pair of orders includes a first order of the first user and an order originating from outside the system received by the at least one computer matched to the first order.

12. The system of claim 9 wherein the at least one computer is programmed to conduct anonymous negotiations between the first user and a plurality of second users selected by the first user.

13. The system of claim 9 comprising a user station having an input device and an output device.

14. The system of claim 13 wherein the at least one computer is programmed to provide available second users from which the first user can select using the input device.

15. The system of claim 13 wherein the at least one computer is programmed to provide a pop-up input window to the output device for receiving user inputs for conducting the negotiations between the first and second users.

\* \* \* \* \*